United States Patent
Byron et al.

(10) Patent No.: US 11,256,704 B2
(45) Date of Patent: *Feb. 22, 2022

(54) SELECTING SUBSTITUTE INGREDIENTS IN A FOOD RECIPE

(71) Applicant: DoorDash, Inc., San Francisco, CA (US)

(72) Inventors: Donna K. Byron, Petersham, MA (US); Mark Delaney, Raleigh, NC (US); Robert Grant, Austin, TX (US); Charlotte Hutchinson, Reigate (GB)

(73) Assignee: DoorDash, Inc., San Francisco, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 16/448,919

(22) Filed: Jun. 21, 2019

(65) Prior Publication Data
US 2019/0310987 A1    Oct. 10, 2019

Related U.S. Application Data

(63) Continuation of application No. 15/800,124, filed on Nov. 1, 2017, now Pat. No. 10,585,900.

(51) Int. Cl.
*G06F 7/00*       (2006.01)
*G06F 16/2457*    (2019.01)
(Continued)

(52) U.S. Cl.
CPC .......... *G06F 16/24575* (2019.01); *A23L 5/10* (2016.08); *G06F 16/24578* (2019.01);
(Continued)

(58) Field of Classification Search
CPC ......... G06F 16/24575; G06F 16/24578; A23L 5/10; H04W 4/38; H04W 4/023; G06Q 30/0631
(Continued)

(56) References Cited

U.S. PATENT DOCUMENTS 8,200,548 B2   6/2012   Wiedl
9,286,589 B2   3/2016   Wiggins
(Continued)

FOREIGN PATENT DOCUMENTS

EP    2304709 A2    4/2011
EP    2463818 A1    6/2012

OTHER PUBLICATIONS

IBM, "Ready to do some cognitive cooking," IBM Chef Watson, https://www.ibmchefwatson.com/community, Printed on Sep. 1, 2017, pp. 1-2.

(Continued)

*Primary Examiner* — Isaac M Woo
(74) *Attorney, Agent, or Firm* — Polsinelli PC

(57) ABSTRACT

The program directs a computer processor to implement a program that selects at least one substitute ingredient for a food recipe based on a plurality of determined criteria. The program receives a food recipe comprising one or more ingredients, instructions, and preparation time. The program determines time constraints of a user. The program identifies one or more Internet of Things (IoT) enabled cooking devices that are available in a kitchen associated with the user to carry out the instructions of the food recipe. The program searches a market database in a market to identify available options for the at least one substitute ingredient found in the market database based on a similarity level of the at least one substitute ingredient compared with at least one ambiguous ingredient in the food recipe, and selects the at least one substitute ingredient according to the plurality of determined criteria.

6 Claims, 6 Drawing Sheets

(51) Int. Cl.
  *G06Q 30/06* (2012.01)
  *A23L 5/10* (2016.01)
  *H04W 4/02* (2018.01)
  *H04W 4/38* (2018.01)

(52) U.S. Cl.
  CPC ........ *G06Q 30/0631* (2013.01); *H04W 4/023* (2013.01); *H04W 4/38* (2018.02)

(58) Field of Classification Search
  USPC .................................................. 707/600–899
  See application file for complete search history.

(56) References Cited

U.S. PATENT DOCUMENTS

| | | |
|---|---|---|
| 2012/0136864 A1 | 5/2012 | Ochtel |
| 2014/0324899 A1 | 10/2014 | Sherman |
| 2016/0203192 A1 | 7/2016 | Bhattacharjya |
| 2016/0225284 A1 | 8/2016 | Schoen |
| 2016/0359325 A1 | 12/2016 | Kawata |
| 2017/0221296 A1 | 8/2017 | Jain |
| 2017/0238751 A1* | 8/2017 | Vengroff ................. F24C 7/087 |
| 2019/0130005 A1 | 5/2019 | Byron |

OTHER PUBLICATIONS

Mell et al., "The NIST Definition of Cloud Computing," National Institute of Standards and Technology, U.S. Department of Commerce, Special Publication 800-145, Sep. 2011, pp. 1-7.

Supercook, "Dinner's Met its Match!", http://www.supercook.com/#/recipes, Printed on Sep. 1, 2017, pp. 1-2.

Wearable, "Connected cooking: The best smart kitchen devices," Hot Wearables, https://www.wareable.com/smart-home/best-smart-kitchen-devices, Printed on Sep. 1, 2017, pp. 1-11.

IBM: List of IBM Patents or Patent Applications Treated As Related (Appendix P), Dec. 19, 2019, pp. 1-2.

IBM: List of IBM Patents or Patent Applications Treated As Related (Appendix P), Mar. 10, 2020, pp. 1-2.

* cited by examiner

FIG. 3

SELECTING SUBSTITUTE INGREDIENTS IN A FOOD RECIPE

BACKGROUND

The present disclosure relates generally to the field of cognitive computing, Internet of Things (IoT), and more particularly to data processing and food recipes.

Cooking food may be referred to as an art that requires an expertise in combining ingredients to create a flavorful and satisfying meal. Various factors contribute to cooking a meal effectively. Those various factors may include savory ingredients, available and functioning cooking appliances, and proper time management of tending to the ingredients as they are being prepared.

A problem that many individuals encounter on a daily basis is deciding what to make for a meal while perusing the supermarket aisles, in light of the current ingredients as well as available cooking appliances, in their home kitchen. Even if a consumer has a recipe in their hands while rolling through the supermarket aisles, they may purchase the proper ingredients only to discover, when they get home, that their crockpot is broken or they do not have enough flour according to the recipe.

BRIEF SUMMARY

Embodiments of the present invention disclose a method, a computer program product, and a system.

According to an embodiment, a method, in a data processing system including a processor and a memory, for implementing a program that adjusts a food recipe based on a plurality of determined criteria. The method receives the food recipe comprising one or more ingredients, instructions, and preparation time, and determines one or more time constraints of a user. The method identifies one or more Internet of Things (IoT) enabled cooking devices that are available in a kitchen associated with the user to carry out the instructions of the food recipe. The method searches a market database in a market to identify one or more available options for the at least one substitute ingredient found in the market database based on a similarity level of the at least one substitute ingredient compared with at least one ambiguous ingredient in the food recipe, and selects the at least one substitute ingredient according to the plurality of determined criteria.

According to another embodiment, a computer program product for directing a computer processor to implement a program that adjusts a food recipe based on a plurality of determined criteria. The storage device embodies program code that is executable by a processor of a computer to perform a method. The method receives the food recipe comprising one or more ingredients, instructions, and preparation time, and determines one or more time constraints of a user. The method identifies one or more Internet of Things (IoT) enabled cooking devices that are available in a kitchen associated with the user to carry out the instructions of the food recipe. The method searches a market database in a market to identify one or more available options for the at least one substitute ingredient found in the market database based on a similarity level of the at least one substitute ingredient compared with at least one ambiguous ingredient in the food recipe, and selects the at least one substitute ingredient according to the plurality of determined criteria.

According to another embodiment, a system for implementing a program that manages a device, includes one or more computer devices each having one or more processors and one or more tangible storage devices. The one or more storage devices embody a program. The program has a set of program instructions for execution by the one or more processors. The program instructions include instructions for adjusting a food recipe based on a plurality of determined criteria. The program instructions include instructions for receiving the food recipe comprising one or more ingredients, instructions, and preparation time, and determining one or more time constraints of a user. The program instructions further include instructions for identifying one or more Internet of Things (IoT) enabled cooking devices that are available in a kitchen associated with the user to carry out the instructions of the food recipe. The program instructions further include instructions for searching a market database in a market to identify one or more available options for the at least one substitute ingredient found in the market database based on a similarity level of the at least one substitute ingredient compared with at least one ambiguous ingredient in the food recipe, and selecting the at least one substitute ingredient according to the plurality of determined criteria.

BRIEF DESCRIPTION OF THE DRAWINGS

FIG. 3 illustrates a multi-factor optimization feature of recipe optimizer assistant 120 of FIG. 1, in accordance with embodiments of the present invention.

DETAILED DESCRIPTION

The present invention discloses a method that considers a substitution of ingredients in a food recipe with respect to a user's time constraints, how close the substitute ingredients are to the original ingredients, and the availability of the user's IoT enabled cooking devices to carry out the recipe instructions. The present invention also considers the sales goals of the grocery store where the ingredients are being purchased.

For example, Rob is shopping at the grocery store at 6 pm on a weeknight and is viewing a recipe on an application on his mobile device that is using the proposed invention. His phone is also connected to the IoT enabled cooking devices in his home kitchen. The proposed invention determines that a time constraint is likely (e.g. by checking Rob's calendar on his mobile device) and thus quicker preparation of the chosen recipe is highly preferred. The recipe that Rob is viewing calls for chicken breast, which is considered an ambiguous item since there are many different replacement options for chicken breast in the grocery store, some of which may take less time to prepare/cook. The proposed invention searches the grocery store database to find alternative options for chicken breast which include frozen chicken, canned chicken, and fresh deli chicken. The items are prioritized by the store based on sales goals. Each item is compared to the availability of the IoT enabled cooking device in Rob's home kitchen.

The proposed invention runs a multi-factor optimization where the alternative options for chicken breast items are compared in relation to the impact of the cooking time using an available IoT enabled cooking device, the prioritization of sales goals of the grocery store, and the deviation of the substituted chicken item from a "closest to scratch" factor. Ultimately, in this example, the frozen chicken may be selected as a substitute for the called-for chicken breast because Rob has an IoT pressure cooker in his home kitchen, which impacts the cooking time dramatically and there is currently a sale on frozen chicken, as well as the fact that the pressure cooker makes a good tasting chicken for the completed recipe.

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not show actual dimensions.

Figure 1:
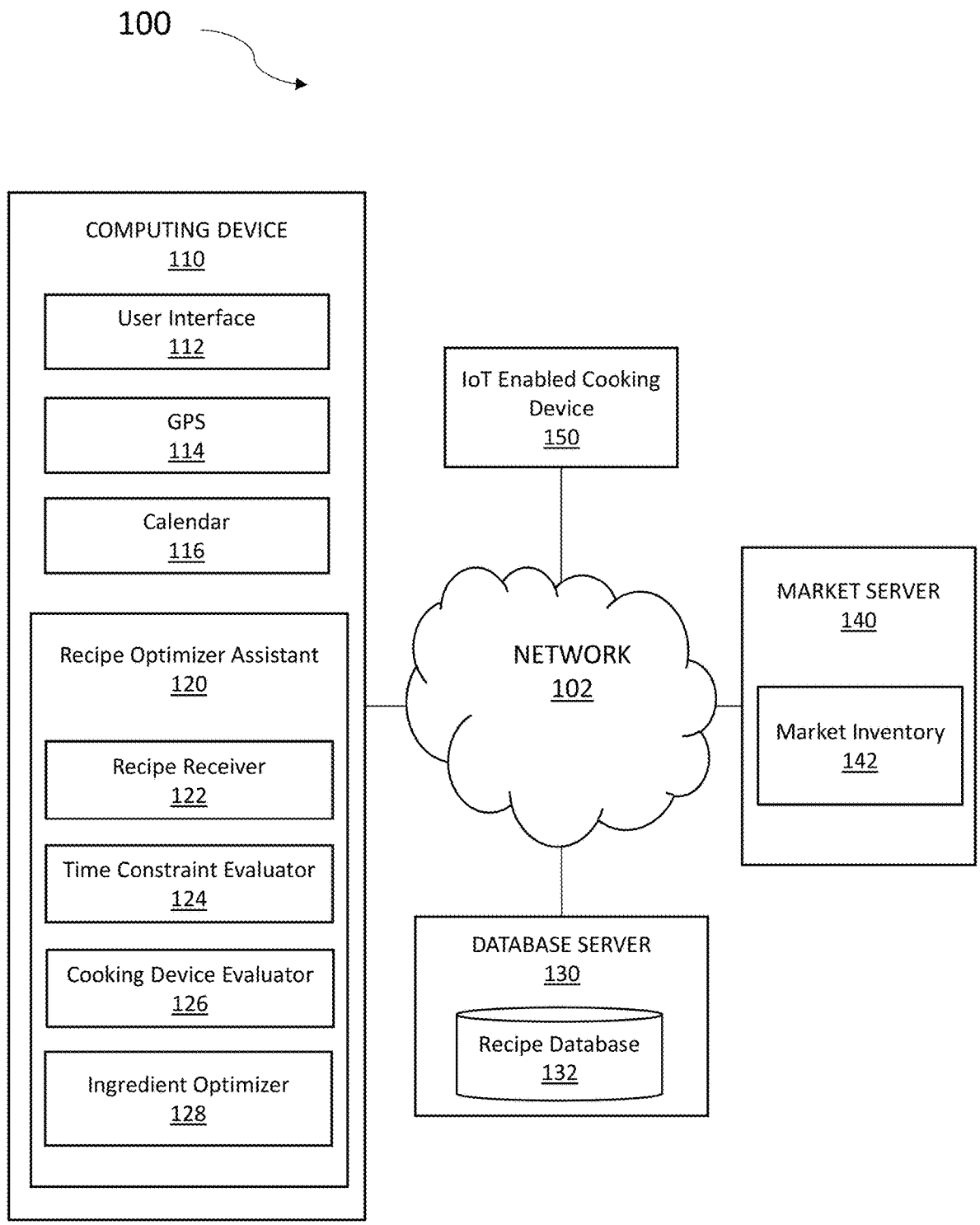
FIG. 1 illustrates computing environment 100, in accordance with an embodiment of the present invention.

FIG. 1 illustrates computing environment 100, in accordance with an embodiment of the present invention. Computing environment 100 includes computing device 110, database server 130, market server 140, and IoT enabled cooking device 150, all connected via network 102. The setup in FIG. 1 represents an example embodiment configuration for the present invention, and is not limited to the depicted setup in order to derive benefit from the present invention.

In the example embodiment, computing device 110 contains user interface 112, global positioning system (GPS) 114, calendar 116 and recipe optimizer assistant 120. In various embodiments, computing device 110 may be a laptop computer, tablet computer, netbook computer, personal computer (PC), a desktop computer, a personal digital assistant (PDA), a smart phone, or any programmable electronic device capable of communicating with database server 130, market server 140, and IoT enabled cooking device 150 via network 102. Computing device 110 may include internal and external hardware components, as depicted and described in further detail below with reference to FIG. 4. In other embodiments, computing device 110 may be implemented in a cloud computing environment, as described in relation to FIGS. 5 and 6, herein. Computing device 110 may also have wireless connectivity capabilities allowing it to communicate with database server 130, market server 140, IoT enabled cooking device 150, and other computers or servers over network 102.

In the example embodiment, computing device 110 includes user interface 112, which may be a computer program that allows a user to interact with computing device 110 and other connected devices via network 102. For example, user interface 112 may be a graphical user interface (GUI). In addition to comprising a computer program, user interface 112 may be connectively coupled to hardware components, such as those depicted in FIG. 4, for receiving user input. In the example embodiment, user interface 112 is a web browser, however in other embodiments user interface 112 may be a different program capable of receiving user interaction and communicating with other devices.

In the example embodiment, GPS 114 is a computer program on computing device 110 that provides time and location information for a user. Modern GPS systems operate on the concept of time and location. In modern GPS systems, four or more satellites broadcast a continuous signal detailing satellite identification information, time of transmission (TOT), and the precise location of the satellite at the time of transmission. When a GPS receiver picks up the signal, it determines the difference in time between the time of transmission (TOT) and the time of arrival (TOA). Based on the amount of time it took to receive the signals and the precise locations of the satellites when the signals were sent, GPS receivers are capable of determining the location where the signals were received. In the example embodiment, GPS 114 is capable of providing real-time location detection of the user, together with an estimated time of arrival for a given destination based on real-time traffic, weather conditions, and so forth.

In the example embodiment, calendar 116 may be a computer program, on computing device 110, that syncs a user's electronic calendar from another computing device, or application, to calendar 116. Calendar 116 may include a user's personal calendar such as birthdays, vacation dates, travelling schedule, personal event information, as well as a user's work calendar such as meeting dates/times, conference dates/times, travelling schedule dates/times, and so forth. Calendar 116, in the example embodiment, is capable of communicating with recipe optimizer assistant 120.

In the example embodiment, database server 130 includes recipe database 132 and may be a laptop computer, tablet computer, netbook computer, personal computer (PC), a desktop computer, a personal digital assistant (PDA), a smart phone, a server, or any programmable electronic device capable of communicating with computing device 110, market server 140, and IoT enabled cooking device 150 via network 102. While database server 130 is shown as a single device, in other embodiments, database server 130 may be comprised of a cluster or plurality of computing devices, working together or working separately.

In the example embodiment, recipe database 132 contains a list of one or more food recipes. A food recipe details necessary ingredients together with their respective measurements (e.g. mL, teaspoon, bushel, cup), stepwise instructions to carry out the recipe, and an estimated time to execute the recipe from start to finish. Recipe database 132 may also include suggested oven cooking temperatures, cooking appliances (i.e. cooking devices), forms of various ingredients (e.g. diced, frozen, pre-chopped), and "closeness to scratch" ingredients. "Closeness to scratch" ingredients include alternative options, or substitute ingredients, for various called-for ingredients in a food recipe. For example, a food recipe may call for mushrooms. The user may have a choice to buy fresh mushrooms from the produce aisle in the grocery store, or canned mushrooms containing preservatives. In this case, the fresh mushrooms from the produce aisle are considered more scratch, or closer to the called-for food recipe ingredient, than the canned mushrooms.

In an exemplary embodiment, recipe database 132 may be organized according to a category of food (e.g. pasta, meat, dairy), a meal time category (e.g. breakfast, lunch, dinner), or any other category or organization deemed most useful for the invention to be utilized.

In various embodiments, recipe database 132 is capable of being stored on recipe optimizer assistant 120, or computing device 110, as a separate database.

In the example embodiment, market server 140 includes market inventory 142 and may be a laptop computer, tablet computer, netbook computer, personal computer (PC), a desktop computer, a personal digital assistant (PDA), a smart phone, a server, or any programmable electronic device capable of communicating with computing device 110, database server 130, and IoT enabled cooking device 150 via network 102. While market server 140 is shown as a single device, in other embodiments, market server 140 may be comprised of a cluster or plurality of computing devices, working together or working separately.

In an exemplary embodiment, market server 140 may be a grocery store database containing market inventory 142, which details a list of food items in stock at the grocery store, a quantity value of those food items in stock, and sales promotions for particular food items in stock. Market inventory 142, in an exemplary embodiment, may also be capable of providing expiration dates for particular food items in stock which may be helpful in promoting these particular items to shoppers before they expire. In alternative embodiments, market inventory 142 may be capable of re-ordering food items, through respective suppliers, that are expired, about to expire, or in high-demand by consumers.

In alternative embodiments, a user may have her own user profile account associated with market server 140, thus enabling market server 140 to recommend ingredients, or products, from the market that are specific to a user's dietary habits, past shopping experience, etc. Additionally, in various embodiments, a user may request delivery to a designated location (e.g. a user's home) of one or more products from market inventory 142 via third party food delivery services.

In an exemplary embodiment, IoT enabled cooking device 150 may include one or more kitchen cooking devices located in the home of a user, or in a location where a user intends to cook a meal with base ingredients of the chosen food recipe. IoT enabled cooking device 150 may be a crockpot, a mixer, a baking oven, a pressure cooker, a microwave oven, or any other kitchen appliance or cooking device located in the home kitchen of the user that is capable of wirelessly communicating with computing device 110, database server 130, and market server 140 via network 102 to relay relevant information to the user in real-time. Relevant information to the user may include the availability of the specific IoT enabled cooking device 150, for example whether it is functioning properly, whether it is clean, whether it needs time to warm up (and how much time) prior to using, and whether it has power in its batteries (if battery operated). The specific IoT enabled cooking device 150 may also convey to the user, via recipe optimizer assistant 120, the required time to cook a food item, the preparation time involved, and the typical amount of time to clean up after the food item is cooked or prepared.

With continued reference to FIG. 1, recipe optimizer assistant 120, in the example embodiment, may be a computer application on computing device 110 that contains instruction sets, executable by a processor. The instruction sets may be described using a set of functional modules. Recipe optimizer assistant 120 receives input from user interface 112, GPS 114, calendar 116, database server 130, market server 140, and IoT enabled cooking device 150. In alternative embodiments, recipe optimizer assistant 120 may be a standalone program on a separate electronic device. In an exemplary embodiment, recipe optimizer assistant 120 may be configured to store various food recipes for a user.

With continued reference to FIG. 1, the functional modules of recipe optimizer assistant 120 include recipe receiver 122, time constraint evaluator 124, cooking device evaluator 126, and ingredient optimizer 128.

Figure 2:
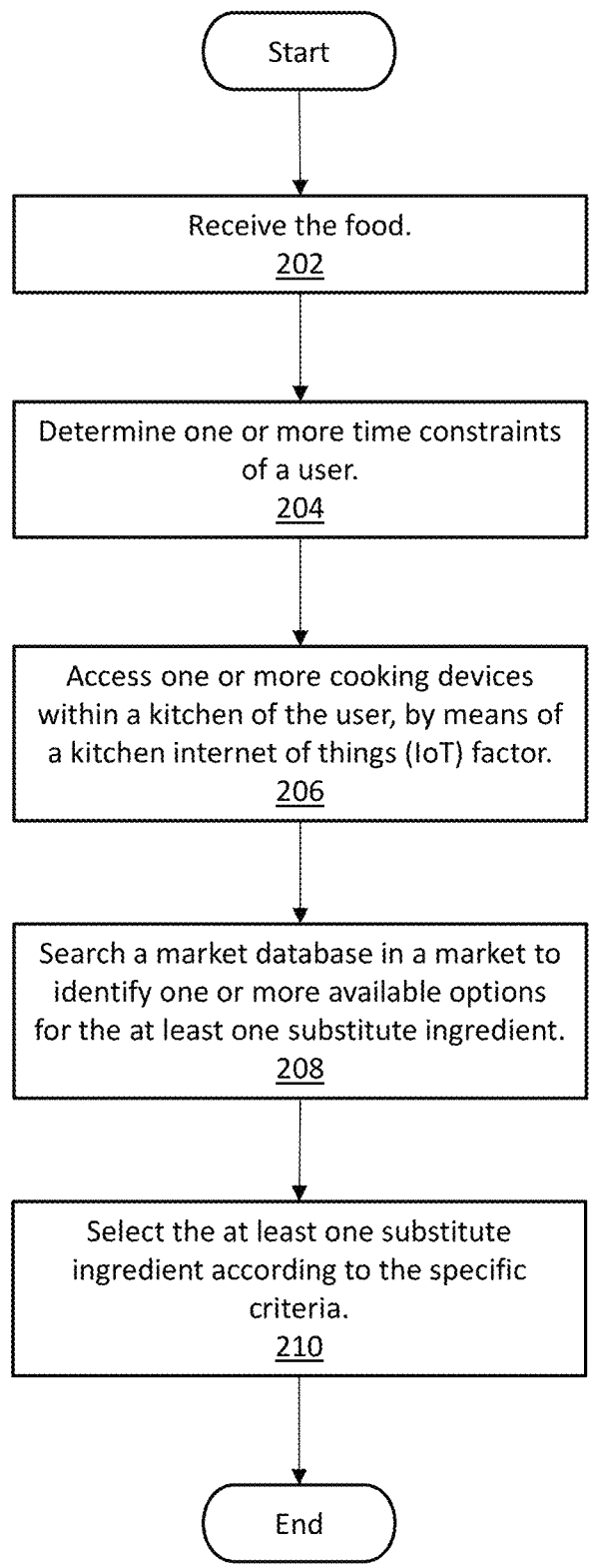
FIG. 2 is a flowchart illustrating the operation of recipe optimizer assistant 120 of FIG. 1, in accordance with embodiments of the present invention.

FIG. 2 is a flowchart illustrating the operation of recipe optimizer assistant 120 of FIG. 1, in accordance with embodiments of the present invention.

With reference to FIGS. 1 and 2, recipe receiver 122 includes a set of programming instructions, in recipe optimizer assistant 120, to receive a food recipe comprising one or more ingredients, instructions, and preparation time (step 202). The set of programming instructions is executable by a processor. In the exemplary embodiment, recipe receiver 122 may obtain (i.e. receive) food recipes from recipe database 132, alternative software applications of the user (i.e. recipe applications on computing device 110), or from user-saved recipes stored on recipe optimizer assistant 120.

With continued reference to FIGS. 1 and 2, time constraint evaluator 124 includes a set of programming instructions in recipe optimizer assistant 120, to determine one or more time constraints of a user (step 204). In an exemplary embodiment, time constraint evaluator 124 may determine the one or more time constraints of the user by evaluating a schedule of the user by accessing a calendar 116 of the user and comparing the calendar 116 of the user with an amount of time required to fulfill the food recipe. Time constraint evaluator 124 may also detect a current location of the user, predict an estimated time for the user to arrive at home, and compare the estimated time for the user to arrive at home with the amount of time required to complete the food recipe. For example, if a user has a meeting at 8 pm and is expected to arrive at home by 7 pm, then a food recipe that requires over an hour of preparation time may interfere with the user's schedule.

With continued reference to FIGS. 1 and 2, cooking device evaluator 126 includes a set of programming instructions in recipe optimizer assistant 120, to identify one or more Internet of Things (IoT) enabled cooking devices 150 that are available in a kitchen associated with the user to carry out the instructions of the food recipe (step 206). The set of programming instructions is executable by a processor.

With continued reference to FIGS. 1 and 2, ingredient optimizer 128 includes a set of programming instructions in recipe optimizer assistant 120, to search a market inventory 142 in a market to identify one or more available options for at least one substitute ingredient found in the market inventory 142 based on a similarity level of the at least one substitute ingredient compared with the at least one ambiguous ingredient in the food recipe (step 208). The at least one ambiguous ingredient in the food recipe comprises a food item that may be substituted with an alternative food item. The set of programming instructions is executable by a processor.

In an exemplary embodiment, a user may adjust one or more settings of ingredient optimizer 128 to broaden or narrow a list of available options at a market for the at least one substitute ingredient based on user input. For example, if the user only wants fresh vegetables (i.e. perishables) as ingredients in the food recipe, then she may adjust the settings in ingredient optimizer 128 to narrow the search results to exclude canned vegetable items, and so forth.

In an exemplary embodiment, ingredient optimizer 128 may be capable of understanding that a combination of ingredients can equal a single ingredient. Cross-referencing one ingredient with one or more substitute ingredients is known to one of ordinary skill in the art.

In an exemplary embodiment, ingredient optimizer 128 prioritizes the determined one or more available options for the at least one substitute ingredient found in the market database based on sales goals of the market. For example, with reference to the illustrative example above, ingredient optimizer 128 accesses market inventory 142 to discover that the ambiguous ingredient "chicken breast" has four alternative purchase options at the market where the user is purchasing her ingredients. Each alternative purchase option has a corresponding score, from 0 to 1 (e.g. 1 representing market interest in selling the food item as quickly as possible), indicating its "relevancy to the market to sell". The four alternative options, in this example, together with the respective assigned score indicating "relevancy to the market to sell" are: (1) refrigerator section chicken [0.5], (2) behind the counter chicken [0.6], (3) frozen chicken [0.8], and (4) canned chicken [0.1]. In this example, the market suggests to purchase frozen chicken (i.e. with a score of 0.8) over the other alternative items, due to the fact that the frozen chicken may be closer to its sell-by date than the other suggested alternative ingredient options.

The score assigned to each alternative, or substitute, ingredient based on "relevancy to the market to sell" is only one factor that is used by recipe optimizer assistant 120 when evaluating which substitute ingredient to select for the food recipe. In alternative embodiments, the other two factors considered by recipe optimizer assistant 120 are the substitute ingredients' closeness to scratch of the original ingredient of the food recipe, and the IoT enabled cooking device 150 availability factor.

In an exemplary embodiment, ingredient optimizer 128 prioritizes the determined one or more available options for the at least one substitute ingredient found in the market inventory 142 based on a similarity level of the at least one substitute ingredient compared with the at least one ambiguous ingredient in the food recipe. The similarity level may include a score, or ranking, of the at least one substitute ingredient, as found in market inventory 142, based on its "closeness to scratch" to the original ingredient (i.e. ambiguous ingredient) in the food recipe.

For example, referring back to the illustrative example above, ingredient optimizer 128 accesses market inventory 142 to discover that the ambiguous ingredient "chicken breast" has four alternative purchase options at the market where the user is purchasing her ingredients, together with a score from 0 to 1 (e.g. 1 representing "closest to scratch") indicating its "closeness to scratch" to the original ingredient (e.g. chicken breast) in the food recipe. The four alternative options, together with the respective assigned score indicating "closeness to scratch" are: (1) refrigerator section chicken [0.7], (2) behind the counter chicken [0.7], (3) frozen chicken [0.5], and (4) canned chicken [0.2]. In this example, the market suggests to purchase either refrigerator section chicken or behind the counter chicken (both with a score of 0.7) over the other alternative items, due to the fact that these ingredients are "closest to scratch" of the food recipe.

The score assigned to each alternative, or substitute, ingredient based on "closeness to scratch" is only one factor that is used by recipe optimizer assistant 120 when evaluating which substitute ingredient to select for the food recipe. In alternative embodiments, the other two factors considered by recipe optimizer assistant 120 are the substitute ingredients' relevancy to the sales goals of the market, and the IoT enabled cooking device 150 availability factor.

In an exemplary embodiment, ingredient optimizer 128 prioritizes the determined one or more available options for the at least one substitute ingredient found in the market database based on availability of the one or more Internet of Things (IoT) enabled cooking devices in a kitchen associated with a user and an amount of time required to complete the food recipe for a given substitute ingredient. In an exemplary embodiment, one or more IoT enabled cooking devices 150 associated with a kitchen of the user may transmit a score, or ranking, detailing its availability to fulfill instructions in the food recipe for a given substitute ingredient.

For example, referring back to the illustrative example above, ingredient optimizer 128 may access IoT enabled cooking device 150 to discover the best available substitute ingredient option based on the availability of an IoT enabled cooking device 150 needed to assist in preparing a chosen alternative option ingredient in a food recipe. In an exemplary embodiment, ingredient optimizer 128 may assign a score from 0 to 1 (e.g. 1 representing a highly recommended IoT enabled cooking device 150 based on availability, preparation time, and clean-up time with regards to each alternative option ingredient). For example, with continued reference to the illustrative example above, the four alternative "chicken breast" options, together with the respective assigned score indicating an "IoT availability factor" are: (1) refrigerator section chicken [0.5], (2) behind the counter chicken [0.5], (3) frozen chicken [0.8], and (4) canned chicken [0.9]. In this example, the market suggests to purchase frozen chicken (with a high score of 0.8 compared to the alternatives), due to the fact that the user may have an IoT enabled cooking device 150 at home that is available for use and can defrost the frozen chicken quickly.

The score assigned to each alternative, or substitute, ingredient based on an "IoT availability factor" is only one factor that is used by recipe optimizer assistant 120 when evaluating which substitute ingredient to select for the food recipe. In alternative embodiments, the other two factors considered by recipe optimizer assistant 120 are the substitute ingredients' closeness to scratch of the original ingredient of the food recipe and the substitute ingredients' relevancy to the sales goals of the market.

With continued reference to FIGS. 1 and 2, ingredient optimizer 128 includes a set of programming instructions in recipe optimizer assistant 120, to select the at least one substitute ingredient according to the specific criteria (step 210). The set of programming instructions is executable by a processor. In an exemplary embodiment, specific criteria refers to (1) the substitute ingredients' relevancy to the sales goals of the market, (2) the substitute ingredients' closeness to scratch, and (3) the IoT enabled cooking device 150 availability factor.

Pursuant to an exemplary embodiment, selecting the at least one substitute ingredient according to the specific criteria further includes performing a multi-factor optimization wherein the at least one substitute ingredient available at a market is evaluated in relation to an amount of time required to complete the food recipe using available Internet of Things (IoT) enabled cooking devices 150 located within a kitchen of a user, sales goals of the market, and a similarity level of the at least one substitute ingredient compared with the at least one ambiguous ingredient in the food recipe.

Figure 3:
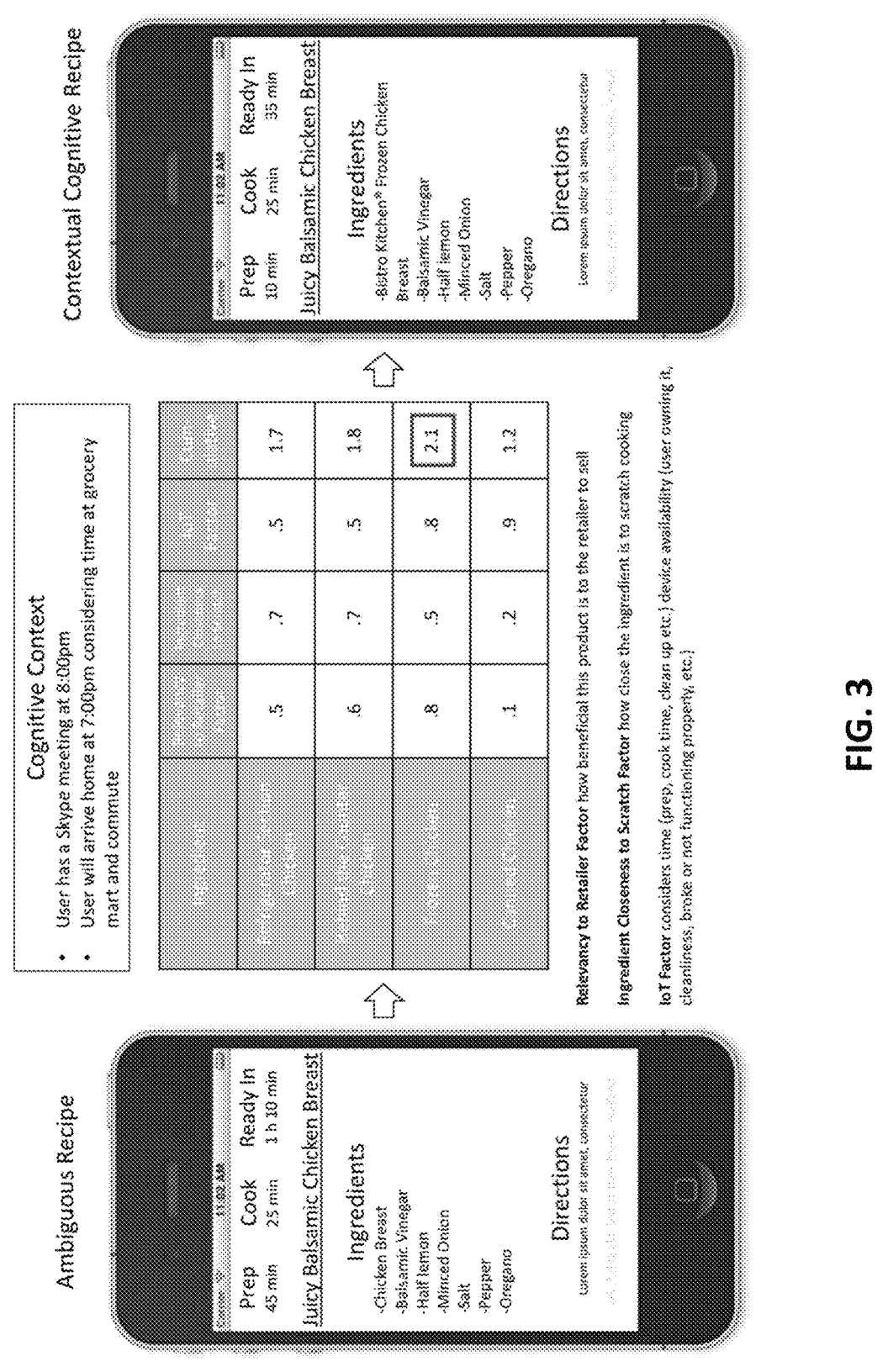

FIG. 3 illustrates a multi-factor optimization feature of recipe optimizer assistant 120 of FIG. 1, in accordance with embodiments of the present invention.

With reference to FIGS. 1, 2, and 3, recipe optimizer assistant 120 performs a multi-factor optimization to select a substitute ingredient for a recipe based on a plurality of determined criteria factors of a user. For example, in an exemplary illustrative use case, a user is on her way home from work and is running late. She is expected to be home by 7:00 pm, however she has a tele-conference call at 8:00 pm and has not yet planned what to make for dinner. The user searches recipe ideas from a mobile application on her smart phone and selects a recipe for an ambiguous Juicy Balsamic Chicken Breast. Recipe optimizer assistant 120 considers the following specific criteria: (1) time constraint evaluator 124 calculates, in real-time, commute to home data of the user via GPS 114, (i.e. traffic, train/bus schedules if applicable) as well as accesses calendar 116 which informs recipe optimizer assistant 120 that the user has a teleconference at 8:00 pm; (2) cooking device evaluator 126 accesses the IoT enabled cooking devices 150 that the user owns and determines whether they are available for use in real-time (i.e. are they currently clean, functioning, etc.); (3) ingredient optimizer 128 searches a market inventory 142 to identify one or more available options for the at least one substitute ingredient that is closest to scratch for an ambiguous ingredient in the food recipe, as well as the sales goals of a market for the at least one substitute ingredient.

With reference to FIG. 3, recipe optimizer assistant 120 filters the results from a user's time constraint factor, a user's available IoT enabled cooking device 150 factor, and a market's available options and sales goals, by assigning a score, or ranking, to each considered substitute ingredient located in the market inventory 142 according to each specific criteria listed above. FIG. 3 depicts a table illustrating the four substitute ingredients found in market inventory 142 for the ambiguous ingredient "chicken breast", together with the three specific criteria factors considered. The assigned scores for each ingredient and its respective criteria factor, as filtered by recipe optimizer assistant 120, are added up and a final cumulative score is presented. The highest cumulative score determines the ingredient selected by ingredient optimizer 128.

With continued reference to the illustrative example above, and with continued reference to FIG. 3, the following cumulative scores for the four substitute ingredients are presented as follows: (1) refrigerator section chicken [1.7]; (2) behind the counter chicken [1.8]; (3) frozen chicken [2.1]; and (4) canned chicken [1.2]. As such, recipe optimizer assistant 120 selects frozen chicken as the optimal substitute ingredient for "chicken breast" in the food recipe based on the availability of the user's pressure cooker, the high need for the market to sell this item, and the closeness to scratch of the frozen chicken item. The user is thus able to successfully prepare the chosen food recipe based on her limited time frame. Additionally, the market successfully makes a sale of a high margin product that they are currently running a special on.

In various alternative embodiments, ingredient optimizer 128 is capable of using a learning feedback mechanism to learn and validate accuracy of a selection, by a user, of the at least one substitute ingredient.

In the example embodiment, network 102 is a communication channel capable of transferring data between connected devices and may be a telecommunications network used to facilitate telephone calls between two or more parties comprising a landline network, a wireless network, a closed network, a satellite network, or any combination thereof. In another embodiment, network 102 may be the Internet, representing a worldwide collection of networks and gateways to support communications between devices connected to the Internet. In this other embodiment, network 102 may include, for example, wired, wireless, or fiber optic connections which may be implemented as an intranet network, a local area network (LAN), a wide area network (WAN), or any combination thereof. In further embodiments, network 102 may be a Bluetooth network, a WiFi network, or a combination thereof. In general, network 102 can be any combination of connections and protocols that will support communications between computing device 110, database server 130, market server 140, and IoT enabled cooking device 150.

Figure 4:
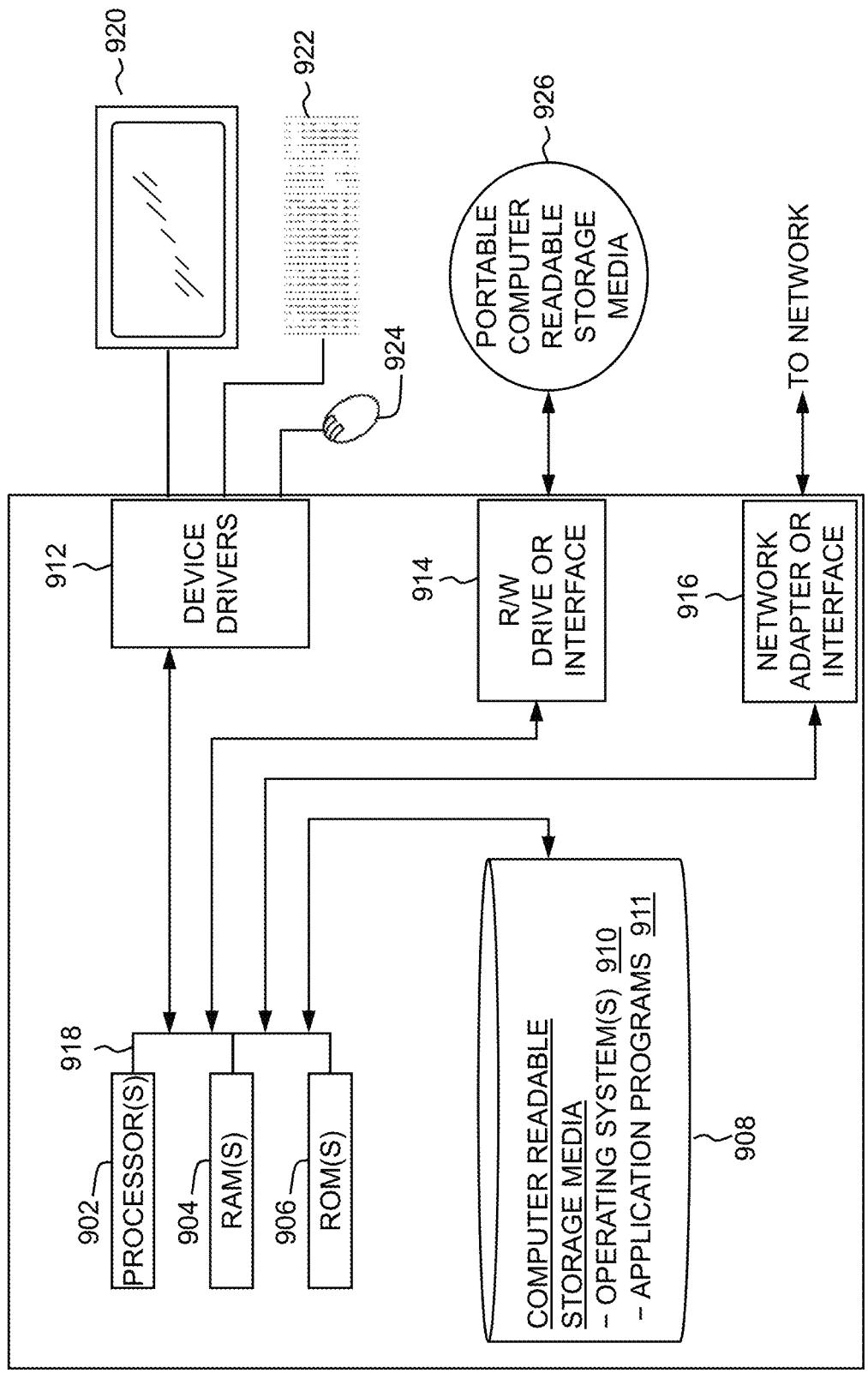
FIG. 4 is a diagram graphically illustrating the hardware components of a computing environment of FIG. 1, in accordance with an embodiment of the present invention.

FIG. 4 is a block diagram depicting components of a computing device (such as computing device 110, database server 130, and market server 140, as shown in FIG. 1), in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as recipe optimizer assistant 120, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 914 to read from and write to one or more portable computer readable storage media 926. Application programs 911 on computing device 110 may be stored on one or more of the portable computer readable storage media 926, read via the respective R/W drive or interface 914 and loaded into the respective computer readable storage media 908.

Computing device 110 may also include a network adapter or interface 916, such as a TCP/IP adapter card or wireless communication adapter (such as a 4G wireless communication adapter using OFDMA technology). Application programs 911 on computing device 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Figure 5:
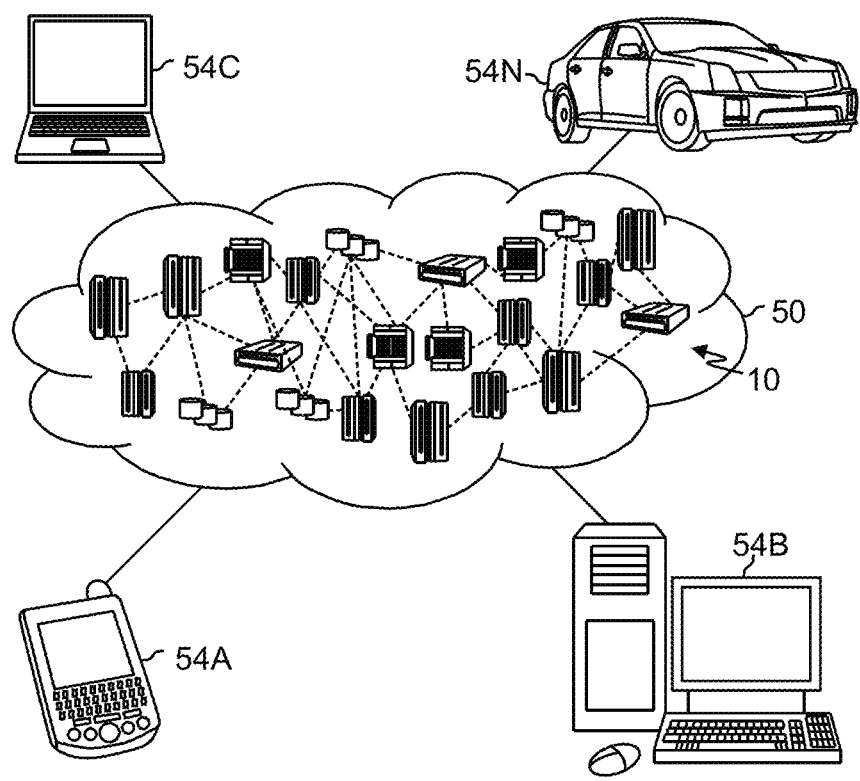
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
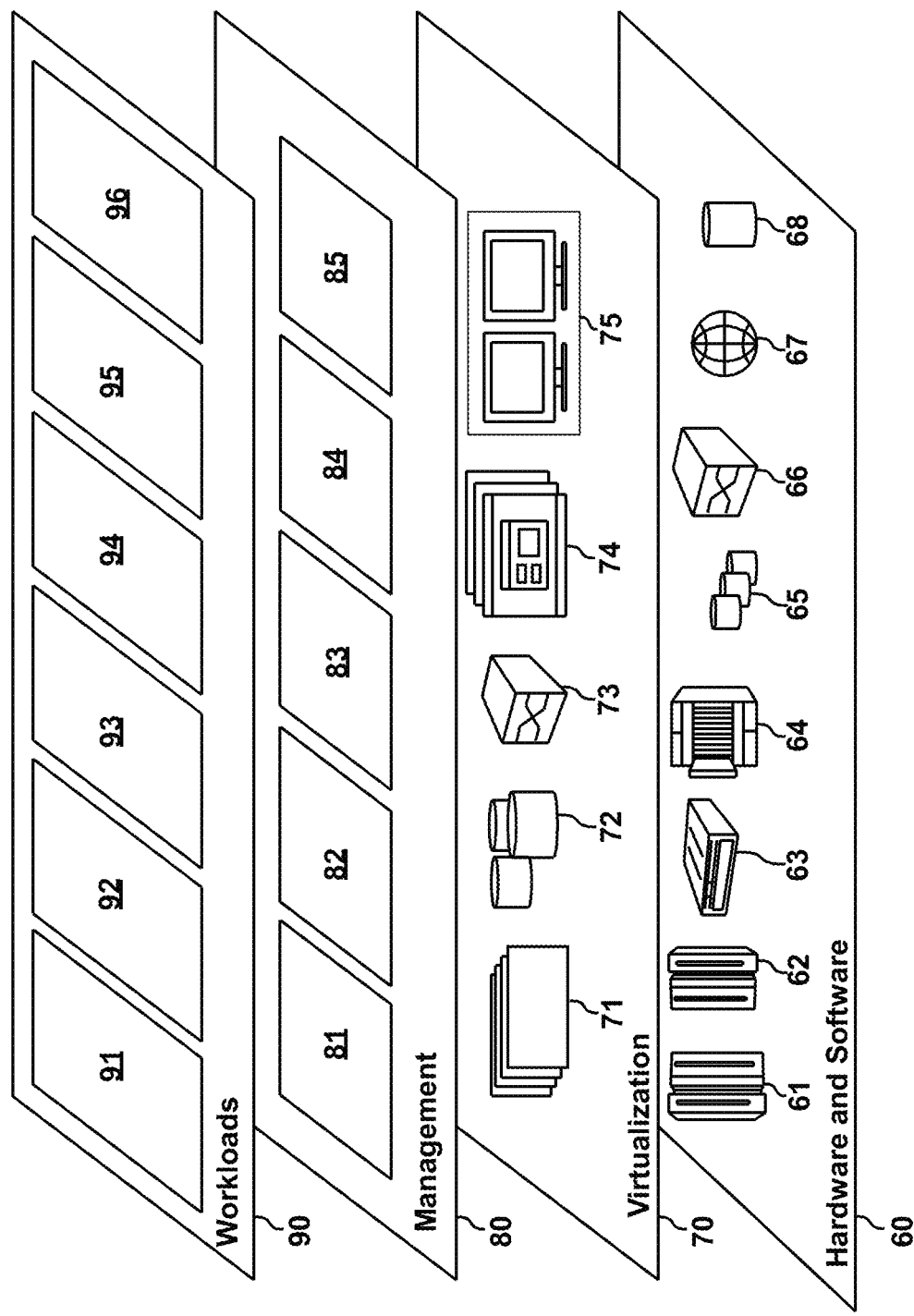
FIG. 6 depicts abstraction model layers of the illustrative cloud computing environment of FIG. 5, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and controlling access to data objects 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

The invention claimed is:

1. A computer-implemented method for adjusting a food recipe based on a plurality of determined criteria, comprising:
   receiving the food recipe comprising one or more ingredients, instructions, and preparation time;
   determining one or more time constraints of a user, wherein the determining comprises performing one or both of:
      evaluating a schedule of the user by accessing a calendar of the user and comparing the calendar of the user with an amount of time required to fulfill the food recipe; and
      detecting a current location of the user, predicting an estimated time for the user to arrive at home, and comparing the estimated time for the user to arrive at home with the amount of time required to complete the food recipe;
   identifying one or more Internet of Things (IoT) enabled cooking devices that are available in a kitchen associated with the user to carry out the instructions of the food recipe;
   searching a market database in a market to identify one or more available options for the at least one substitute ingredient found in the market database based on a similarity level of the at least one substitute ingredient compared with at least one ambiguous ingredient in the food recipe,
      wherein the at least one ambiguous ingredient in the food recipe comprises a food item that may be substituted with an alternative food item; and
   selecting the at least one substitute ingredient according to the plurality of determined criteria, wherein selecting the at least one substitute ingredient according to the plurality of determined criteria further comprises:
      performing a multi-factor optimization wherein the at least one substitute ingredient available at a market is evaluated in relation to an amount of time required to complete the food recipe using the one or more identified Internet of Things (IoT) enabled cooking devices that are available in a kitchen associated with the user, sales goals of the market, and a similarity level of the at least one substitute ingredient compared with the at least one ambiguous ingredient in the food recipe.

2. The computer-implemented method of claim 1, further comprising:
   prioritizing the determined one or more available options for the at least one substitute ingredient found in the market database based on sales goals of the market.

3. The computer-implemented method of claim 1, further comprising:
   prioritizing the determined one or more available options for the at least one substitute ingredient found in the market database based on a similarity level of the at least one substitute ingredient compared with the at least one ambiguous ingredient in the food recipe.

4. The computer-implemented method of claim 1, further comprising:
   prioritizing the determined one or more available options for the at least one substitute ingredient found in the market database based on availability of the one or more identified Internet of Things (IoT) enabled cooking devices and an amount of time required to complete the food recipe.

5. The computer-implemented method of claim 1, further comprising:
   adjusting one or more settings to broaden or narrow a list of available options at a market for the at least one substitute ingredient based on user input.

6. The computer-implemented method of claim 1, further comprising:
   using a learning feedback mechanism to learn and validate accuracy of a selection, by a user, of the at least one substitute ingredient.

\* \* \* \* \*